(12) United States Patent
Kalkunte et al.

(10) Patent No.: US 9,788,220 B2
(45) Date of Patent: Oct. 10, 2017

(54) BANDWIDTH ESTIMATION BASED ON LOCATION IN A WIRELESS NETWORK

(71) Applicant: Vivint, Inc., Provo, UT (US)

(72) Inventors: Venkat Kalkunte, Saratoga, CA (US); Pravin Bathija, San Jose, CA (US)

(73) Assignee: Vivint, Inc., Provo, UT (US)

( * ) Notice: Subject to any disclaimer, the term of this patent is extended or adjusted under 35 U.S.C. 154(b) by 721 days.

(21) Appl. No.: 14/200,607

(22) Filed: Mar. 7, 2014

(65) Prior Publication Data

US 2014/0269385 A1     Sep. 18, 2014

Related U.S. Application Data

(60) Provisional application No. 61/793,415, filed on Mar. 15, 2013.

(51) Int. Cl.
*H04W 24/08*     (2009.01)

(52) U.S. Cl.
CPC ................... *H04W 24/08* (2013.01)

(58) Field of Classification Search
CPC .......................... H04L 12/1432; H04W 24/08
USPC ........................................................ 370/252
See application file for complete search history.

(56) References Cited

U.S. PATENT DOCUMENTS

| 7,474,620 | B2 | 1/2009 | Kline et al. |
| 8,447,849 | B2 | 5/2013 | Saffer et al. |
| 8,462,812 | B2 | 6/2013 | Gurbuz et al. |
| 8,498,211 | B2 | 7/2013 | Bellur et al. |
| 8,559,975 | B2 * | 10/2013 | Lin ......................... G01S 5/021 455/456.1 |
| 9,439,071 | B2 * | 9/2016 | Jabara ................... H04W 12/06 |
| 2008/0207221 | A1 | 8/2008 | Chari |

(Continued)

FOREIGN PATENT DOCUMENTS

WO     2013000073     1/2013

OTHER PUBLICATIONS

Martignon et al., "Efficient and Truthful Bandwidth Allocation in Wireless Mesh Community Networks", obtained from https://www.lri.fr/~fmartignon/papers/TON2014.pdf, accessed on Mar. 6, 2014, pp. 1-15.

(Continued)

*Primary Examiner* — Melvin Marcelo
(74) *Attorney, Agent, or Firm* — Holland & Hart LLP

(57) ABSTRACT

Methods, systems, and devices are described that are directed to estimating the bandwidth at a particular location in a wireless mesh network. In some embodiments, a performance determination apparatus includes a signal receiver module, a location module, a signal analysis module, a report module, and a placement module. In some embodiments, the signal analysis module collects received signal strength indicator (RSSI) on one or more receive chains of the receiver and analyzes various aspects of signal quality. In some embodiments, the signal analysis module estimates the bandwidth available at the location, estimates the latency at the location, or both. In some embodiments, the report module represents the quality of the signal graphically by overlaying a representation of the signal quality on a map of the area. In some embodiments, the placement module recommends where to place customer premises equipment (CPE) in order to maximize signal quality.

13 Claims, 8 Drawing Sheets

(56) References Cited

U.S. PATENT DOCUMENTS

| | | | |
|---|---|---|---|
| 2009/0070379 A1* | 3/2009 | Rappaport | G06Q 10/067 |
| 2010/0291947 A1 | 11/2010 | Annamalai et al. | |
| 2012/0258732 A1* | 10/2012 | Jeong | H04L 12/1432 455/456.1 |
| 2013/0016660 A1 | 1/2013 | Jalil et al. | |
| 2014/0072022 A1* | 3/2014 | Medles | H04B 17/391 375/227 |
| 2014/0269870 A1* | 9/2014 | Olgaard | H04L 1/24 375/224 |

OTHER PUBLICATIONS

International Search Report for PCT/US2014/021016. Aug. 14, 2014.

* cited by examiner

| Basic rates of 802.11n (Mbps) 20 MHz channel, single stream, 800 nsec GI, equal modulation | | | | | | | |
|---|---|---|---|---|---|---|---|
| 6.5 | 13 | 19.5 | 26 | 39 | 52 | 58.5 | 65 |

| Rates of 802.11n (Mbps) 20 MHz channel, two streams, 800 nsec GI, equal modulation | | | | | | | |
|---|---|---|---|---|---|---|---|
| 13 | 26 | 39 | 52 | 78 | 104 | 117 | 130 |

| Rates of 802.11n (Mbps) 40 MHz channel, single stream, 800 nsec GI, equal modulation | | | | | | | |
|---|---|---|---|---|---|---|---|
| 13.5 | 27 | 40.5 | 54 | 81 | 108 | 121.5 | 135 |

| Rates of 802.11n (Mbps) 20 MHz channel, single stream, 400 nsec GI, equal modulation | | | | | | | |
|---|---|---|---|---|---|---|---|
| 7.2 | 14.4 | 21.7 | 28.9 | 43.3 | 57.8 | 65 | 72.2 |

| Rates of 802.11n (Mbps) 20 MHz channel, two streams, 800 nsec GI, unequal modulation | | | | | |
|---|---|---|---|---|---|
| 39 | 52 | 65 | 58.5 | 78 | 97.5 |

BANDWIDTH ESTIMATION BASED ON LOCATION IN A WIRELESS NETWORK

CROSS REFERENCES

The present application claims priority to U.S. Provisional Patent Application No. 61/793,415, titled: "BANDWIDTH ESTIMATION BASED ON LOCATION IN A WIRELESS NETWORK," filed on Mar. 15, 2013, which is assigned to the assignee hereof.

TECHNICAL FIELD

This disclosure relates generally to methods and systems for estimating the bandwidth at a particular location in a wireless network, and more particularly to estimating bandwidth at a particular location in a wireless mesh network.

BACKGROUND

It can be difficult to predict how a network will perform for a given user at a particular location. Even for wired Internet networks (such as cable and DSL), factors such as the amount of traffic on the network and the distance from a station can affect the performance of the network, and thus the experience of a particular user in the network.

Many of these complications are magnified in a wireless network. For example, if an ISP provides Internet access through a wireless network (such as, for example, a mesh network) the quality of the connection at a given point can be difficult to predict. Factors such as the distance to a particular node in the network, the presence of interference, changes in foliage, and other factors can affect signal quality and thus the quality of the user's experience. The difficulty of predicting how the network will perform at one location versus another can make it difficult to know which individuals to approach about using the ISP's network, and what sort of performance the potential subscriber can expect.

BRIEF SUMMARY OF THE INVENTION

This disclosure, in one aspect, relates to approaches for analyzing a signal in a wireless network. The analysis may be of a signal for accessing the Internet through a wireless mesh network provided by an Internet Service Provider (ISP). In such a system, wireless nodes may be distributed throughout a geographic area (such as a neighborhood or city) and the analysis may be part of evaluating the performance of the network at a particular location.

A performance determination apparatus may include a signal receiver module for receiving a signal to be analyzed. In one embodiment, the signal receiver module includes a 4×4 MIMO receiver. A location module may be configured to determine the location at which the signal analysis module receives the signal under analysis. The location module may, for example, include a GPS unit. A signal analysis module may perform a signal analysis of the signal and may store data values relating to the quality of that signal. The signal analysis module may, for example, collect received signal strength indicator (RSSI) on one or more receive chains of the receiver used to analyze the signal.

The signal analysis module may analyze various aspects of signal quality. The signal analysis module may estimate the bandwidth available at the location using the signal, may estimate the latency at the location, and other parameters associated with the quality of the signal. A report module may represent the quality of the signal graphically for users; for example, the report module may overlay a representation of the signal quality on a map of the area.

A placement module may recommend where to place customer premises equipment (CPE) at the location in order to maximize signal quality. The placement module may also recommend specific hardware that, given the characteristics of the signal, may help improve network performance using the signal.

Also disclosed is a method for acquiring additional subscribers for a wireless network provider. The method may involve identifying a potential subscriber of a wireless ISP that provides Internet access through a mesh network and, at the location of the potential subscriber, receiving and analyzing a wireless signal from at least one node in the mesh network. The method may also involve, based on the analysis, estimating the bandwidth and other network performance characteristics of the mesh network at the location of the potential subscriber.

The method may also involve identifying possible causes of interference of signal degradation and taking steps to reduce that interference. The method may further involve determining an estimated cost per bandwidth unit of competing ISPs in the area and, based on the estimated bandwidth available from the wireless ISP (as determined by the signal analysis), offering Internet access at a price that is the same as, or lower than, the cost per bandwidth unit offered by competitors.

Other aspects, as well as the features and advantages of various aspects, of the present invention will become apparent to those of ordinary skill in the art from the ensuing description, the accompanying figures, and the appended claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 3A-3D illustrate various rates available using 802.11n;

Figure 1:
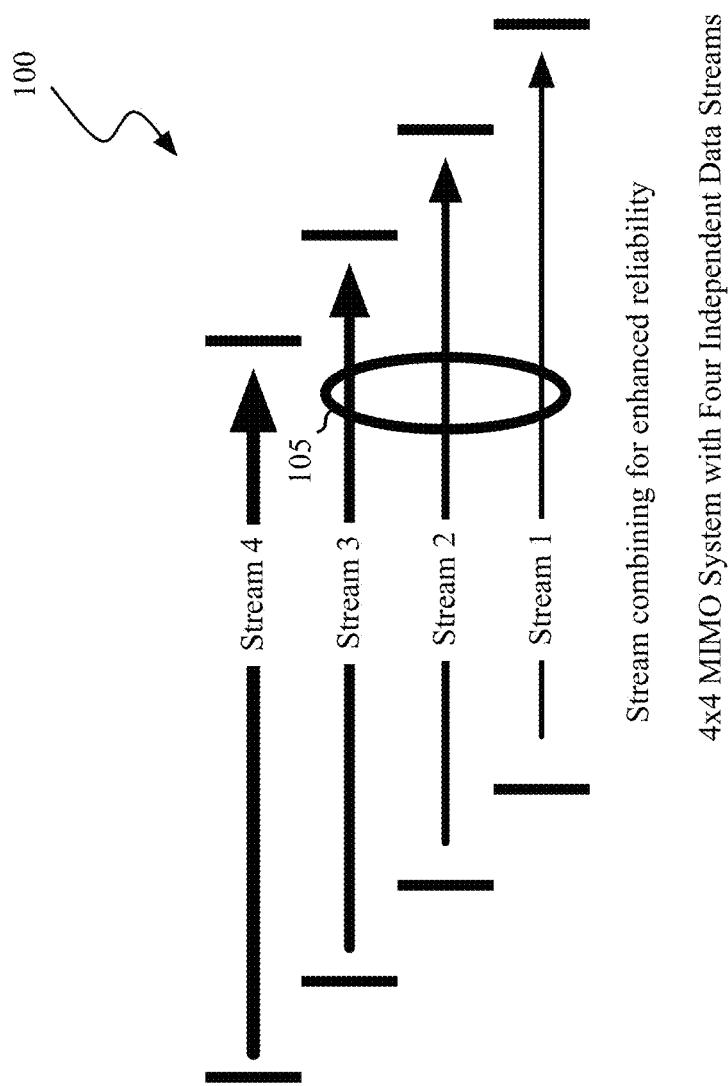
FIG. 1 illustrates multiple data streams in a 4×4 MIMO system.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

There are several key technologies and features in the 802.11n standard. This section includes a brief technical treatment of various significant technologies.

One significant technology is high throughput physical layer (PHY): MIMO. The new PHY supports OFDM modulation with additional coding methods, preambles, multiple streams and beam-forming. These can support higher data rates, and a much larger range of data rates than earlier 802.11 standards. One example is the Multiple Input, Multiple Output (MIMO) technique that is synonymous with 802.11n. One approach to creating high throughput PHY is to create 40 MHz channels. Two adjacent 20 MHz channels are combined to create a single 40 MHz channel. This relatively simple technique (already used in some point-to-point bridges and consumer equipment) can more than double the effective data rate under a given set of RF conditions.

Another significant technology is Efficient MAC: MAC aggregation. Two MAC aggregation methods are supported to efficiently pack smaller packets into a larger frame. This reduces the number of frames on the air, and reduces the time lost to contention for the medium, improving overall throughput.

Efficient MAC: Block acknowledgement is another significant technology. This is a performance optimization where one acknowledgement can cover many transmitted frames: an ACK is no longer required for every frame. This improvement can be particularly valuable for streaming traffic such as video. This technique was first introduced in 802.11e.

Power saving: power save multi-poll is an extension of the U-APSD and S-APSD concepts introduced in 802.11e.

Various techniques can be used to provide High throughput PHY. High Throughput PHY: MIMO 802.11n achieves significant improvements in performance through the use of MIMO. In MIMO, the transmitting and receiving stations each have multiple RF chains with multiple antennas. For example, a MIMO system may have two transmitting and two receiving antennas (2:2). Each antenna may be connected to its own RF chain for transmit and receive. One possible advantage to such an architecture is that it allows signals received at each antenna to be decoded independently. The baseband processing on the transmit side can synthesize different signals to send to each antenna, while at the receiver the signals from different antennas can be decoded individually.

Under normal, line of sight conditions, the receiving antennas all "hear" the same signal from the transmitter. Even if the receiver uses sophisticated techniques to separate the signals heard at antennas 1 and 2, it is left with the same data. In some circumstances, if the transmitter attempts to send different signals to antennas A and B, those signals will arrive simultaneously at the receiver, and will effectively interfere with each other. In such a situation, it is not always possible to better the performance of a non-MIMO system; it is often as effective to use only one antenna at each station. Nearly all 802.11 stations built to date use two antennas. However, these stations do not use MIMO—the radio in the station switches a single radio chip from one antenna to the other, so only one is used at any time. Using two antennas in this way helps to negate the effects of multipath; when one antenna is in a multipath 'null', the other antenna is likely to have a better signal. It is generally reckoned that using antenna diversity in this way improves overall reception by perhaps 3-6 dB, although the effect is of course statistical. MIMO is different in that both antennas are driven by or receiving signals at all times, and those transmitted signals need not be identical.

Figure 2:
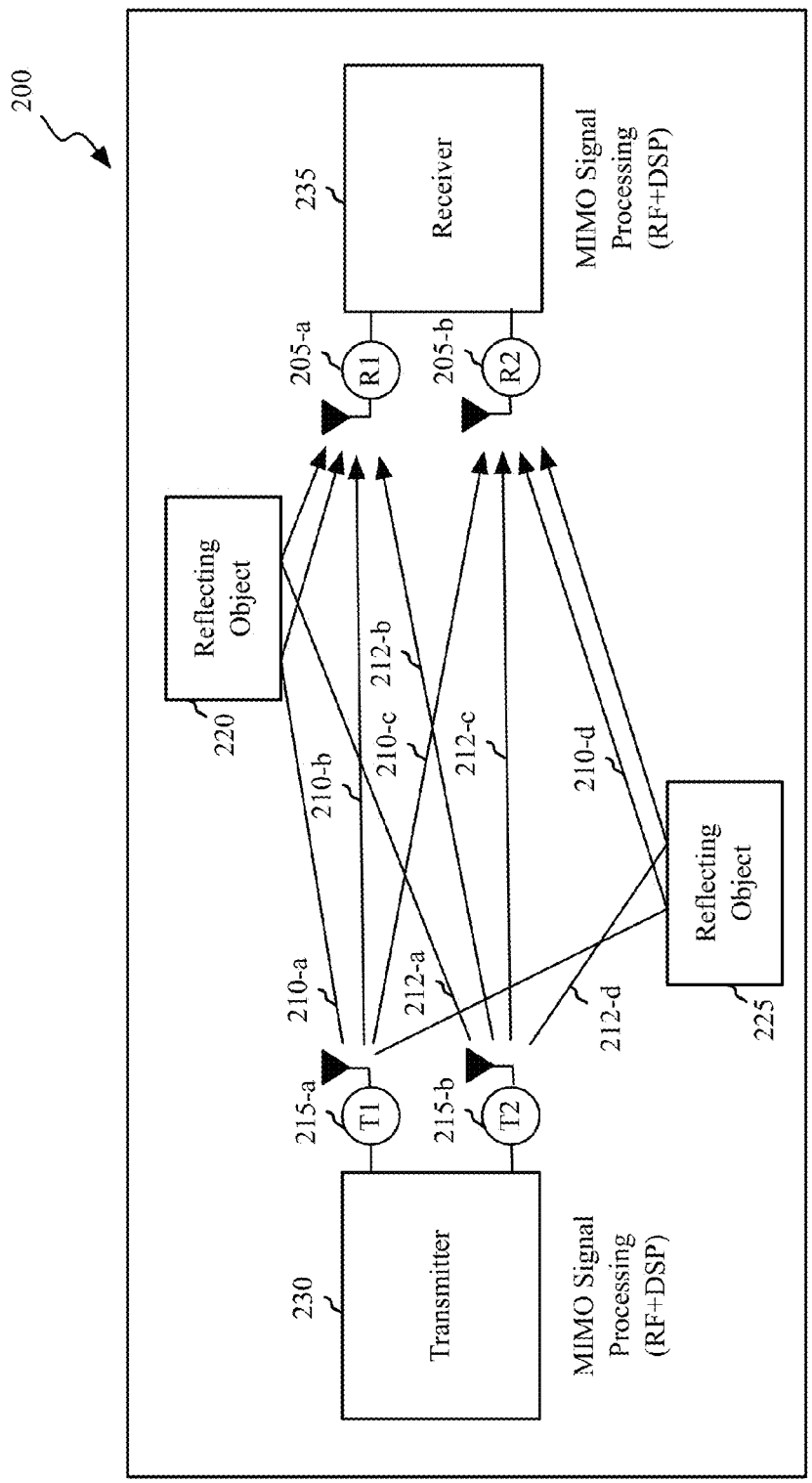
FIG. 2 illustrates an occurrence of multipath situations in MIMO processing.
Figure 4:
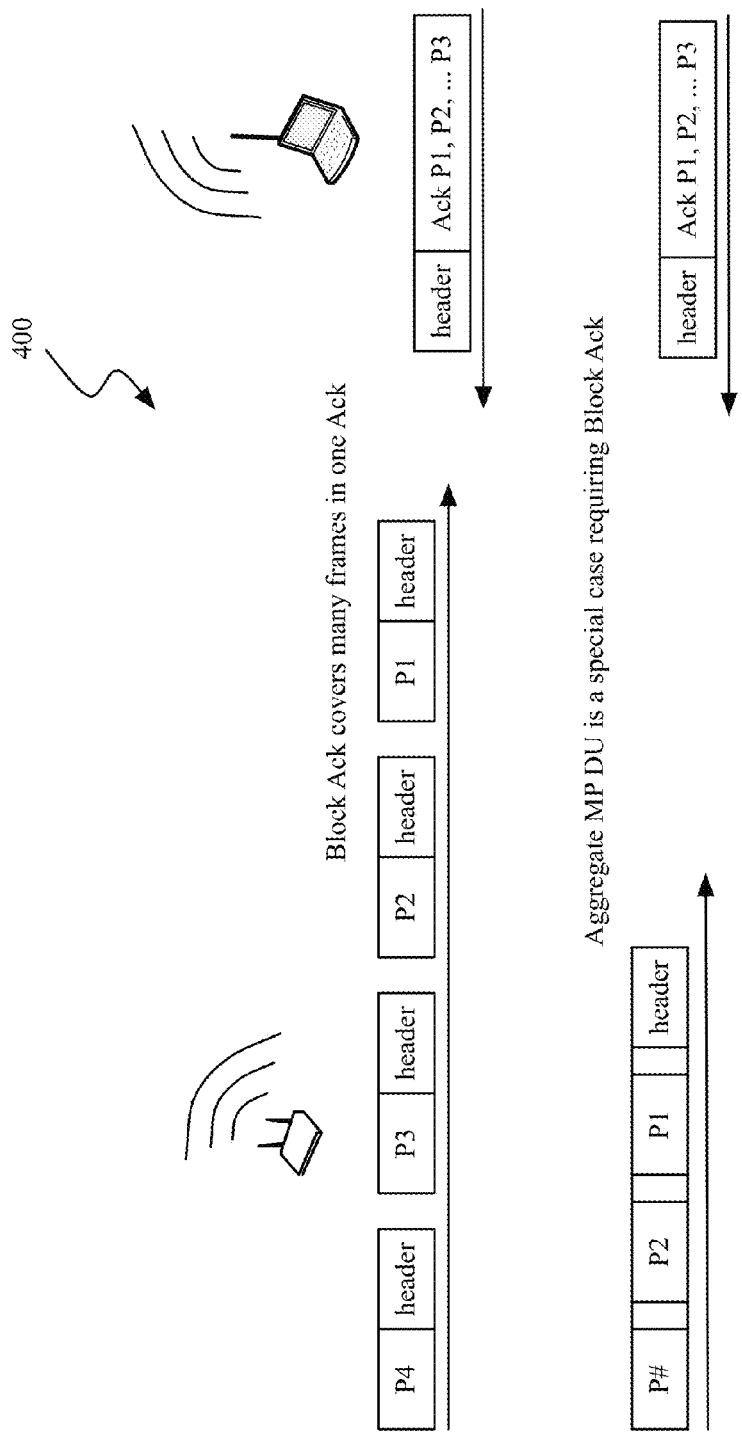
FIG. 4 illustrates one embodiment of the use of a block acknowledgement for multiple frames.

FIG. 1 illustrates one embodiment of a 4×4 MIMO system with four independent data streams 100. In the depicted embodiment, streams may be combined 105 for enhanced reliability, as described above. FIG. 2 illustrates one embodiment of multipath effects 200 that may result in difficulty receiving a signal due to multipath reflections. A receiving antenna 205 will see different signals 210, 212 from each transmit antenna 215. Distortion of the RF channel can be extremely complicated, but often amounts to multipath reflections. The transmit antenna 215 radiates a signal over a broad arc, and it reflects off various objects 220, 225 in the surrounding area as seen in FIG. 2. Each reflection entails a loss of signal power, and the longer the reflected path, the more delay is introduced relative to a line-of-sight signal. In the past, multipath has been the enemy of radio systems, as the receiver sees a dominant signal (line of sight if it is present), and all the multipath signals tend to interfere with it, effectively acting as noise or interference and reducing the overall throughput of the system. Multipath effects also change over time, as objects in the path move, and movement of reflecting objects results in a Doppler shift of the frequency of the received signal, further complicating the control mechanisms needed to counter multipath.

Often, it is favorable to have each transmit/receive pair operate with a completely independent RF path: a 2×2 (2 antennas at each station) system will have double the throughput of a single-antenna 1×1 system, and a 3×3 configuration could extend to triple the throughput. 802.11n defines MIMO configurations from 2:1 to 4×4 antennas and spatial streams.

MIMO is the often considered the most difficult aspect of 802.11n to understand: multipath (reflected RF between transmitter and receiver) is normally the enemy of performance, but with MIMO, multipath can be used constructively. Line of sight normally gives the best performance, but with MIMO it generally provides just baseline data rates. However reflected signals are usually much weaker than primary, line-of-sight signals. Even though losing line-of-sight may allow use of more RF paths and hence the additive MIMO effect, the signal-to-noise ratio of each path may be considerably worse than previously. It can be difficult to predict the relative weight of these two opposing effects without extensive field testing.

MIMO generally works best when antennas are positioned more than half a wavelength apart. For 5.5 GHz, half a wavelength is about 2.7 cm or one inch. The 802.11n standard mandates at least two spatial streams (antennas) for access points and one spatial stream for client devices, with a maximum of 4 spatial streams per device.

One key question in MIMO systems is how to tune the transmit signals at different antennas for optimum reception at the receiver. 802.11n offers two methods for this. Implicit feedback requires the MIMO receiver to transmit long training symbols, which are received by the MIMO transmitter. There is an assumption that the RF channel's characteristics are reciprocal, and that the transmit and receive radios at each end are identical, and under these conditions the measurements will be valid in the MIMO transmit direction.

Implicit feedback is not generally held to be a promising method in practice, so a second, explicit feedback mechanism has also been defined. The MIMO transmitter 230 sends a long series of training symbols which the MIMO receiver 235 analyses so as to characterize the differential path loss and delay for each antenna 205, 215 and spatial stream. The receiver 235 then sends this information back to the transmitter 230 which can optimize the transmit signals 210, 212 and modulation for the RF path characteristics.

This is a complicated procedure, as many calculations must be performed and RF conditions may be changing rapidly, requiring continuous adjustment. Since 802.11n uses OFDM, each symbol is modulated around many carriers rather than only a single carrier, and each carrier should generally be measured for each transmit-receive antenna pair for full characterization. But explicit feedback (MRQ) can be an important mechanism in enabling MIMO.

Transmit beamforming (TxBF) is a technique that has been used in radio for many years, and has been applied to earlier forms of Wi-Fi by some startup companies in recent years. In 802.11n, beamforming will allow an AP to 'focus' its transmission to a particular client in the direction of that client (and vice versa for a client with multiple antennas), allowing higher signal to noise ratios and hence higher data rates than would otherwise be the case. Beamforming APs can target multiple clients, but typically do so for unicast frames.

By carefully controlling the time (or phase) of the signal transmitted from multiple antennas, it is possible to shape the overall pattern of the received signal, emulating a higher-gain, or directional antenna in the direction of the target. The same implicit and explicit feedback mechanisms used to characterize the MIMO channel can also allow beamforming.

In practice, beamforming may be used when MIMO with SDM is not feasible, as in line-of-sight conditions. This is because beamforming generally aims to produce a single, coherent RF signal at the receiver, while SDM relies on multiple, independent signals. Beamforming and MIMO SDM are in fact similar techniques; MIMO has been described as beamforming to steer antenna pattern nulls to different receive antennas.

Beamforming will generally work well with only 802.11n clients as it relies heavily on feedback messages from the client.

Earlier versions of 802.11 have used 20 MHz channels, defined in the 2.4 GHz and 5 GHz bands. Some vendors have increased throughput, particularly in point-to-point bridging applications, by using two adjacent channels simultaneously, usually modulating each channel separately then combining the streams at the far end to provide a 40 MHz channel.

802.11n specifies operation in the same 20 MHz channels used by 802.11b/g in the 2.4 GHz and 802.11a in the 5 GHz bands, but adds a mode where a full 40-MHz wide channel can be used. As might be expected, this offers approximately twice the throughput of a 20 MHz channel. However, while in the 5 GHz band, the channels are defined as pairs of existing 20 MHz channels; the channels do not line up with previously-defined 20 MHz channels in the 2.4 GHz band. This means that when a 40 MHz channel is used in 2.4 GHz, it will interfere with all possible 802.11b/g channels: effectively, 802.11n can generally be used only in 2.4 GHz in one channel, and in the absence of 802.11b/g users.

Radio systems have to adapt to the signal and noise characteristics of the RF path, and they usually accomplish this by changing the modulation rate. For a given signal to noise ratio (SNR), the system will change the modulation rate to provide the best compromise between data rate and error rate: at any point, modulating for a higher data rate will increase the error rate. This is a continuous decision-making process with the transmitter relying on feedback from the receiver about its SNR in order to adjust the transmit modulation.

While 802.11a and g specify 7 rates (6, 12, 18, 24, 36, 48 and 54 Mbps), 802.11n provides many more: over 300. However, the basic set is of 8 rates as shown in FIG. 3A. FIG. 3A shows a set of rates for one spatial stream in a 20 MHz RF channel and with an 800 nsec guard-interval and "equal modulation" on all spatial streams 300. This basic set of rates is comparable to the 802.11b/g rates above: each rate is improved by about 8% (e.g. 18 to 19.5 Mbps) by using slightly wider bandwidth and improved modulation. The 65 Mbps rate has no equivalent in 802.11a/g.

Other rates are generally derived in multiples of the basic rates above 305.

Referring now to FIG. 3C and FIG. 3D, the 40 MHz channel allows slightly more than twice the data rate of two 20 MHz channels 310 while the shorter 400 nsec guard interval allows slightly higher data rates than 800 nsec 315. For a given system, the range of choices will be smaller than the tables in FIG. 3 would indicate, because some of these factors are fixed for a given system.

As discussed elsewhere, a 40 MHz channel will not often be feasible for an enterprise deployment in the 2.4 GHz band. However 40 MHz channels are likely to be widespread in the 5 GHz band.

As described above, a 3×3 system will normally support 3 spatial streams. However, where there is insufficient RF path isolation between streams, even a 3×3 system may not be able to support 3 diverse streams. Also, a 3×1 system only supports one spatial stream, and many clients may initially be equipped with only one antenna.

The guard interval is the time between OFDM symbols in the air. Normally it will be 800 nsec; there is generally an option for a 400 nsec guard interval, but as noted above, reliable detection with this value may be challenging under normal conditions.

When data arrives at the PHY layer for transmission, it is often scrambled and coded. This alters its spectral characteristics in order to achieve the best signal to noise ratio, and also includes built-in error correction, commonly known as convolutional coding. The 802.11n standard includes block convolutional coding (BCC), as included in previous 802.11 standards, and also adds an option for low density parity check LDPC coding, which can improve effective throughput for given RF conditions.

All spatial streams may use the same (equal) modulation, or they may carry different (unequal) modulation and coding. An example might be where there are three spatial streams with good MIMO characteristics, but one stream has a high noise floor or a low signal level; under these conditions, the weak stream would support a lower data rate than the other streams.

There also exist various techniques to enhance the MAC layer. One such technique is frame aggregation. Since a client (or AP) must contend for the medium with every frame it wishes to transmit, and contention, collisions on the medium and backoff delays waste time that would otherwise be used for sending useful traffic, 802.11n incorporates mechanisms to aggregate frames at stations. This can help reduce the number of contention events. Many tests have shown the efficacy of this effect in prior 802.11 standards. For instance, in 802.11g, a given configuration can send 36 Mbps of data using 1500 Byte frames, but when the frame length is reduced to 256 Bytes, throughput drops to 16 Mbps. It is important when conducting these tests to isolate other effects such as the number of clients in the cell. With MAC-layer aggregation, a station with a number of frames to send can opt to combine them into an aggregate frame (MAC MPDU). The resulting frame contains less header overhead than would be the case without aggregating, and because fewer, larger frames are sent, the contention time on the wireless medium is reduced. Two different mechanisms are provided for aggregation, known as Aggregated MSDU (A-MSDU) and Aggregated-MPDU (A-MPDU).

Another MAC layer enhancement is multiple traffic ID block acknowledgement (MTBA). Earlier 802.11 standards demanded an ACK frame for every unicast data frame transmitted. The new block ACK feature allows a single ACK frame to cover a range of received frames 400. MTBA is particularly useful for streaming video and other high-speed transmissions; however, if a frame has not been received, there will be a delay before a non-acknowledge is received and re-transmission can be accomplished. This is not often a problem with video, where re-transmission is often not feasible, given the time constraints of the media, but may be problematic for other applications.

The format of the Block ACK is a bit-map to acknowledge each outstanding frame: it is based on a mechanism originally defined in 802.11e. The bit-map identifies specific frames not received, allowing selective retransmission of only those required.

Another MAC layer enhancement is reduced inter-frame spacing (RIFS). When a station (client or AP) has a number of frames to send sequentially, it must generally pause between frames. These pauses constitute overhead for the overall network. Prior to 802.11n, the pause between frames transmitted by the same station was set at single inter-frame spacing (SIFS). 802.11n defines a smaller spacing, called reduced inter-frame spacing (RIFS). RIFS cannot be used for the pause between frames transmitted by different stations, and it can only be used when the station is transmitting in 802.11n HT (greenfield) mode. It accomplishes similar goals to the MAC aggregation functions explained earlier, but arguably with less implementation complexity. 802.11n defines a RIFS interval as 2 usec, whereas SIFS is 16 usec.

A further MAC layer enhancement is spatial multiplexing power save, or SM power save. The basic 802.11n power save mode is based on the earlier 802.11 power save function. In this mode, the client notifies the AP of its power-save status (intention to sleep), then shuts down, only waking for ad-hoc traffic indication maps (ATIMs) broadcast by the AP, while the AP buffers downlink traffic for sleeping stations between ATIMs. Power save in 802.11n is enhanced for MIMO operation with SM power save mode. Since MIMO requires maintaining several receiver chains powered-up, standby power draw for MIMO devices is likely to be considerably higher than for earlier 802.11 equipment. A new provision in 802.11n allows a MIMO client to power-down all but one RF chain when in power save mode. When a client is in the 'dynamic' SM power-save state, the AP sends a wake-up frame, usually an RTS/CTS exchange, to give it time to activate the other antennas and RF chains. In static mode, the client decides when to activate its full RF chains, regardless of traffic status.

By placing mesh points strategically as "listeners" and collecting Received Signal Strength Indicator (RSSI) on the 4 available Receive chains in the QHS710, it is possible to accurately predict the locations where there are high throughput opportunities. The practical significance of this discovery a-priori helps reduce presumptive disposition with regard to available network bandwidth at a particular location. It also improves customer acquisition success rate. There may be other uses for this location precision where a future MiFi device can advertise itself to the network so that location information can be harvested for retail or commercial purposes. A site survey tool uses the Quantenna QHS710 as a signal analyzer which can detect not just the strength of the signal at a given location but other information such as interference profiles.

Once this signal information is harvested, the signal information can be uploaded to create a map file, such as a Google earth file 600 (e.g., see FIG. 6), to visually convey the information. QHS710 APIs provide critical information that can be programmatically extracted by client software running on a laptop that can re-construct later a composite network view. The tool may be used by a service provider, such as an ISP, to determine the optimal placement of mesh points in a residence to achieve best performance, estimate performance of the signal at the curbside so that a determination whether an indoor or outdoor CPE is appropriate. When there are MiFi devices in the network, it is possible to commercially exploit location information.

Figure 5:
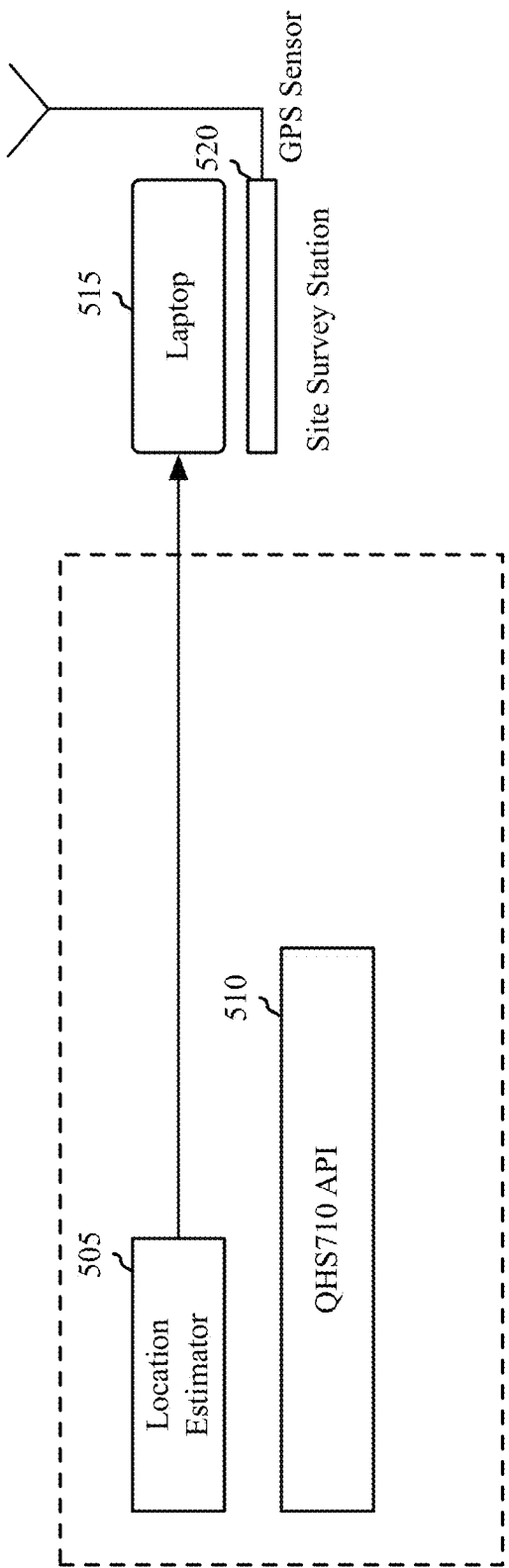
FIG. 5 illustrates one embodiment of a location estimator in connection with a laptop computer.

Referring to FIG. 5, a location estimator 505 (also referred to herein as a performance determination apparatus) may use application programming interface (APIs) of the QHS710 510 or other communications device to analyze a signal received from one or more nodes in a mesh network at a particular location, as described in further detail below. The performance determination apparatus may be implemented as software, firmware, and hardware on a laptop computer. The performance determination may be distributed across multiple physical devices; for example, one hardware component may include the Quantenna QHS710 for receiving the signals, another hardware component (such as the laptop 515) may include software for analyzing the signal, and another hardware component (such as a global positioning system (GPS) sensor 520) may be used to obtain location information. Software and firmware to facilitate signal analysis may be distributed across all of these hardware components.

Figure 7:
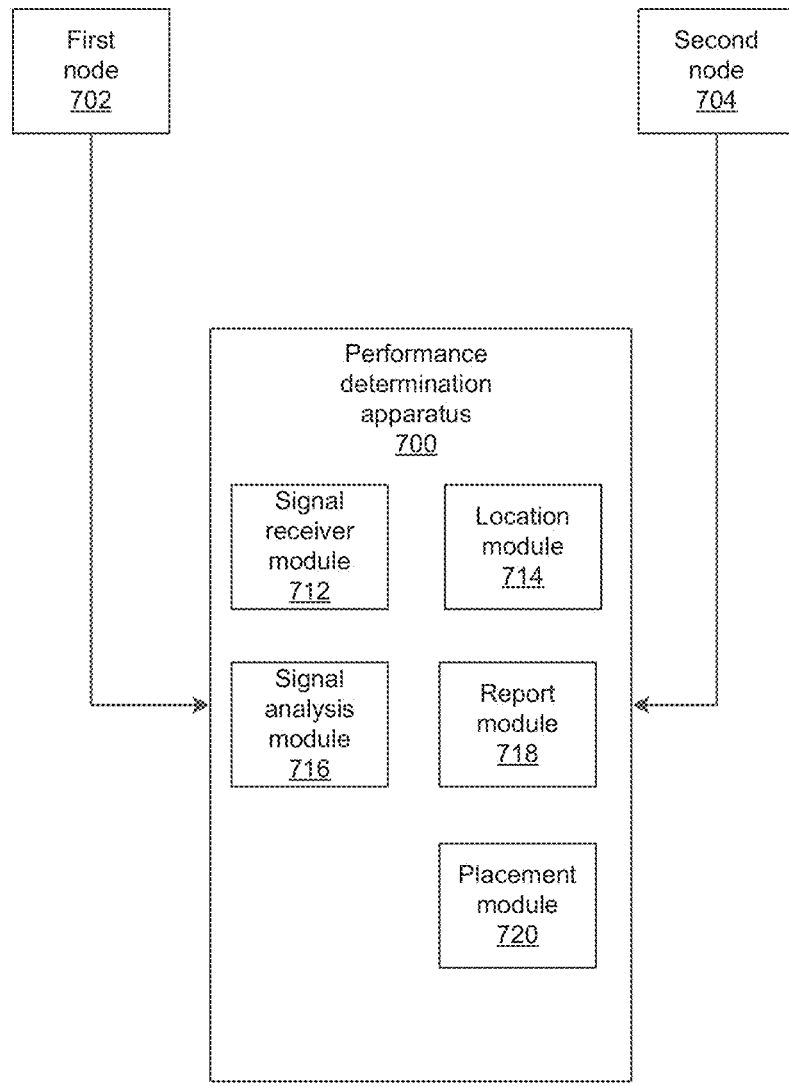
FIG. 7 is a schematic block diagram illustrating one embodiment of a performance determination apparatus communicating with nodes in a network.

FIG. 7 illustrates one embodiment of a performance determination apparatus 700. The performance determination apparatus 700 may, in one embodiment, be a mobile unit that can be to test network performance at various locations. In the example shown in FIG. 7, the performance determination apparatus 700 may be within range of a first node 702 and a second node 704 of a mesh network. The mesh network may be deployed by an Internet service provider (ISP) to provide Internet access to various subscribers. In one embodiment, the mesh network is a wireless mesh network. The performance determination apparatus 700 may be used to estimate network coverage and network performance at the location of the performance determination apparatus 700.

In one embodiment, an ISP may situate the performance determination apparatus 700 at a location associated with a potential subscriber. The performance determination apparatus 700 may be positioned inside or outside the residence of the potential subscriber. In other embodiments, the technician operating the performance determination apparatus 700 may test the performance of the network at various positions at the potential subscriber's location.

The signal receiver module 712 may be configured to receive a signal under analysis. The signal receiver module 712 may include a Quantenna QHS710 communications component; however, other communications components may also be used. In certain embodiments, the signal receiver module 712 includes multiple antennas coupled to separate radio chains and is enable to receive and transmit data using MIMO.

The location module 712 may be configured to determine the location at which the signal receiver module 712 receives the signal under analysis. The location module 712 may, in one embodiment, include a GPS module for determining the position. In one embodiment, the performance determination apparatus 700 determines the location before beginning the signal analysis operations described herein.

A signal analysis module 716 may be configured to analysis the signal and to store data values relating to the quality of that signal. The signal analysis module 716 may, for example, determine and store the RSSI values associated with receipt of the signal. The signal analysis module 716 may determine the signal-to-noise ratio associated with the signal. The signal analysis module 716 may estimate the bandwidth associated with the signal by, for example, downloading a test file. The signal analysis module 716 may test the latency of the connection. The signal analysis module 716 may also be configured to determine an interference profile for the signal. Other analysis may also be used in addition to, or instead of, those described above.

In the embodiment shown in FIG. 7, the performance determination apparatus 700 may be able to connect to more than one node at a particular location. In the embodiment shown, the performance determination apparatus 700 may be able to connect to the first node 702 and the second node 704 of the mesh network. The performance determination apparatus 700 may perform separate tests on the signal received from each node and store information related to both signals. The performance determination apparatus 700 may also determine which connection offers better performance at the particular location.

Figure 6:
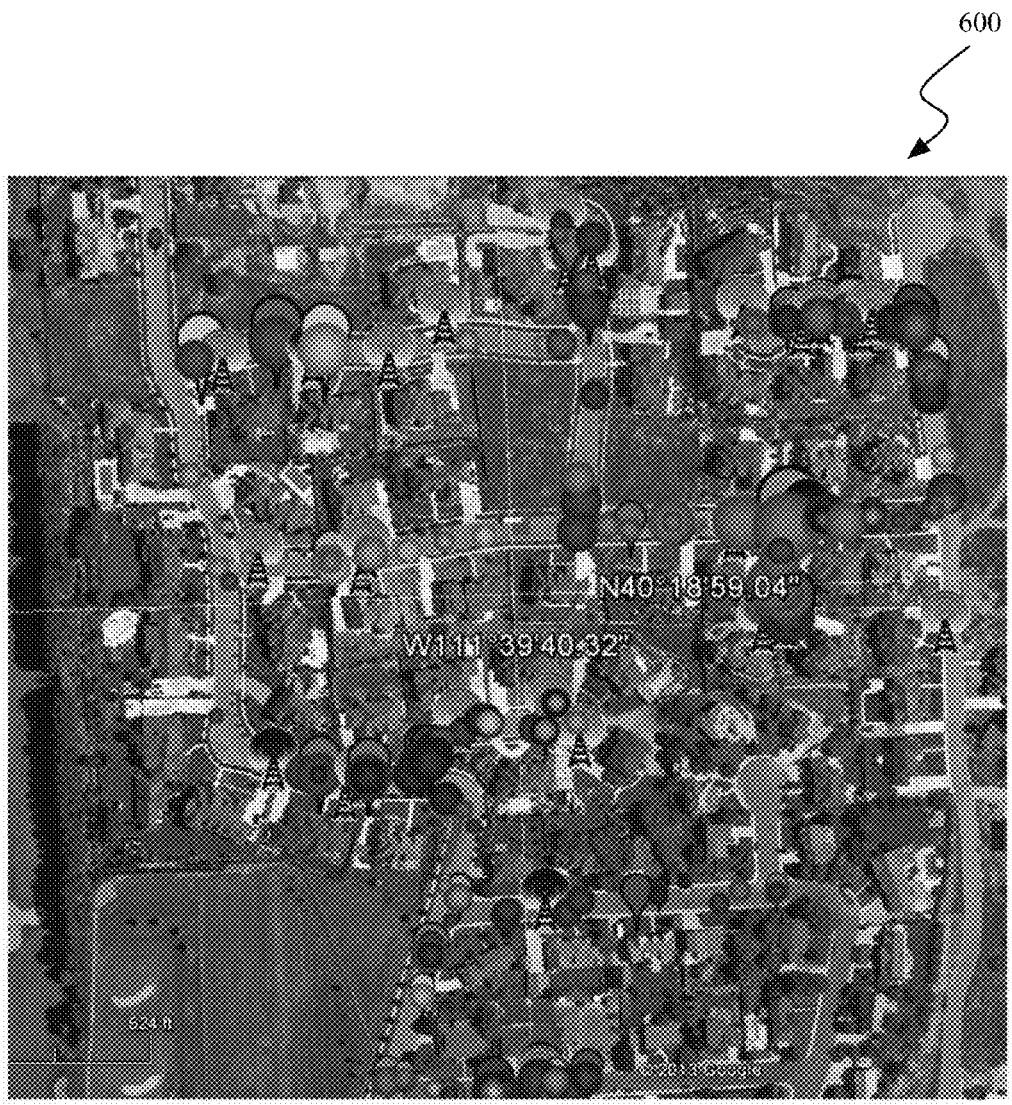
FIG. 6 illustrates one embodiment of a map comprising a graphical representation of signal quality.

The performance determination apparatus 700 may also include a report module 718 confirmed to report the data values that result from the analysis in human-readable form. The report module 718 may report those data values relating to the quality of the signal. In one embodiment, the report module 718 graphically represents the quality of the signal under analysis on a map. The map 600 shown in FIG. 6 is an example of one possible output of the report module 718.

The performance determination apparatus 700 may also include a placement module 720. At a particular location (such as a subscriber's residence), there may be multiple possible placement sites. The placement module 720 may be configured to recommend a particular place on the location for placement of customer-premises equipment (CPE) for CPE associated with the mesh network. For example, the placement module 720 may recommend installation of CPE components outside the residence.

The placement module 720 may be further configured to recommend placement of additional nodes in the mesh network based on the signal analysis. In such an embodiment, the placement module 720 may have the data from the signal analysis of multiple locations, allowing the placement module 720 to determine which locations that consistently have poor signal quality and that may benefit from the placement of an additional mesh network node.

In certain embodiments, the nodes in the wireless mesh system may have components to aid in signal analysis at particular locations. For example, a test module on the first node 702 may be configured to send predetermined test data to facilitate signal analysis. The test module may cause the first node 702 to send a first test data package using multiple streams, then a single stream. The test component may cause the first node 702 to use beamforming techniques (such as those discussed above) to direct the signal towards the performance determination apparatus 700. The test component may further generate test data describing performance of the signals sent by the performance determination apparatus 700 to the first node 702. The performance determination apparatus 700 may also be configured to vary characteristics of the transmitted data (using multiple, separate MIMO streams, a combined MIMO stream, beamforming, etc) in order to determine the ability of a device to transmit information at the location of the performance determination apparatus 700.

In such embodiments, the performance determination apparatus 700 may share information with the node generating the signal being tested. For example, the performance determination apparatus 700 may transmit the location information for the performance determination apparatus 700 to the first node 702 to allow the first node 702 to attempt various optimization steps for transmitting data to the performance determination apparatus 700.

Figure 8:
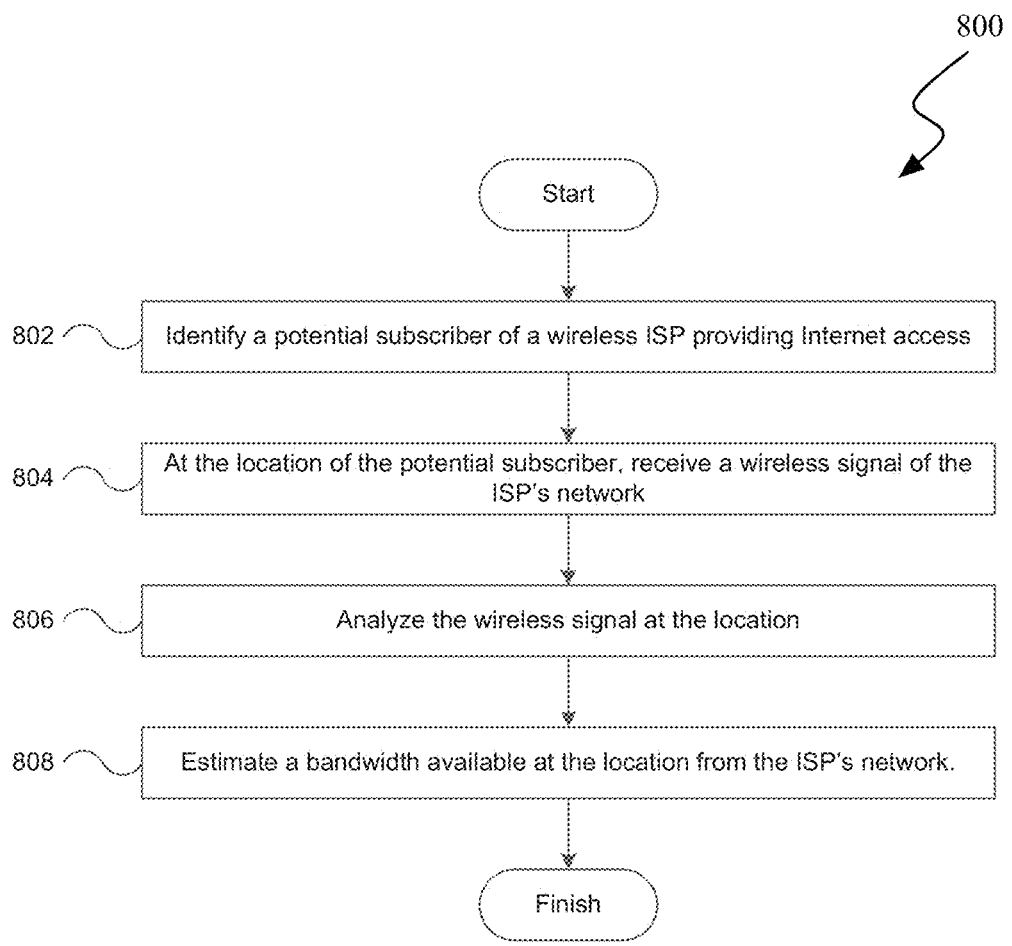
FIG. 8 is a schematic flow chart diagram illustrating one embodiment of a method for estimating wireless performance at a location in an ISP's network.

FIG. 8 illustrates one embodiment of a method 800 for providing Internet access. The method 800 may involve, at reference numeral 802, identifying a potential subscriber of a wireless ISP providing Internet access in the area of the potential subscriber. The potential subscriber may be an individual or business who has contacted the ISP and requested signal analysis. The potential subscriber may be an individual or business to whom the ISP would like to provide Internet access.

The method 800 may also involve, at reference numeral 804, receiving a wireless signal from the ISP's network at the location of the potential subscriber. The ISP's network may implement a wireless mesh network. This step may further involve connecting a test device (such as the performance determination apparatus 700) to the ISP's network. In certain embodiments, the step may also involve indicating to one or more devices in the ISP's network generating the signal that a technician is performing a signal analysis. The one or more devices may take specific steps (such as those described above) to help with signal analysis and to provide the technician with a more accurate view of signal quality at the location.

The method 800 may further involve, at reference numeral 806, analyzing the wireless signal at the location. The analysis may take place at multiple positions at the potential subscriber's location; for example, a first test may be done outside the home, and a second test may be done inside the home. As noted above, this step may involve collecting RSSI information from one or more receive chains of a receiver used to analyze the wireless signal.

The method 800 may also involve, at reference numeral 808, estimating the bandwidth available at the location from the ISP's network. As noted above, other performance factors (such as latency, error rate, etc) may also be evaluated and be part of the signal analysis process.

The method 800 may involve identifying sources of interference. In certain embodiments, this identification may be based on data derived from the signal analysis and also from visual inspection of the location. For example, a technician may notice heavy foliage that may be causing interference. The technician may note that there is heavy rain during the testing that may affect the quality of the signal. The technician may also note the presence of power lines or other possible sources of interference that may degrade the quality of the signal. In certain embodiments, the technician may be able to identify one or more actions for reducing the level of interference.

The signal analysis information may also be useful in determining how to price the service offered to the potential subscriber. In one embodiment, the method 800 may involve comparing the estimated bandwidth using the ISP's network at the particular location with an estimate of the competing bandwidth available from one or more competing ISPs at the location. For example, a sales representative may have an estimate of the bandwidth and network performance of a cable connection or DSL connection at the location. In one embodiment, the sales representative may ask permission to test the potential subscriber's current Internet connection.

The method 800 may also involve identifying a price per bandwidth unit at the location from the competing ISPs. For example, the sales representative may estimate the cost per Mbps paid by the potential subscriber for the Internet access from a competing ISP. The sales representative may then offer Internet access from the wireless ISP at a price per bandwidth unit that is the same as, or lower than, that of the competing ISPs. In this manner, the sales representative may be able to increase the odds of making a sale by providing the potential subscriber with evidence of how the wireless ISP can provide Internet access at a competitive rate.

In certain embodiments, the sales representative and/or the performance determination apparatus 700 may determine other factors that may affect price at the location. For example, the performance determination apparatus 700 may determine that the potential subscriber's location is ideal for placement of another node in the mesh network. In light of this information, the sales representative may offer a further discount in exchange for allowing the wireless ISP to install a node at the potential subscriber's location.

Although the foregoing description contains many specifics, these should not be construed as limiting the scope of the present invention, but merely as providing illustrations of some of the presently preferred embodiments. The examples given in the application are by way of illustration, and are non-limiting examples. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby. The appended claims are not means-plus-function claims as set forth in 35 U.S.C. §112, sixth paragraph, unless the particular claim uses the phrase "means for." While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the systems and methods to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A performance determination apparatus comprising:
    a signal receiver module having a plurality of antennas to receive test data from a first node of a mesh network, a first copy of the test data being received via a multiple input multiple output (MIMO) signal having four streams, the data in each stream of the MIMO signal being transmitted with varying characteristics, a second copy of the test data being received via a single stream signal;
    a global positioning system (GPS) module configured to determine a GPS location of the signal receiver module when the signal receiver module received the MIMO signal;
    a signal analysis module configured to determine a signal quality parameter of the MIMO signal based at least in part on signal quality values for each stream of the MIMO signal at a plurality of GPS locations; and
    a placement module configured to identify a GPS placement site to position an additional node in the mesh network based at least in part on the signal quality parameters of the MIMO signal taken at the plurality of GPS locations.

2. The performance determination apparatus of claim 1, further comprising a report module configured to report one or more data values relating to a quality of the MIMO signal in human-readable form.

3. The performance determination apparatus of claim 2, wherein the report module is configured to graphically represent the quality of the MIMO signal on a map.

4. The performance determination apparatus of claim 1, wherein the signal analysis module is configured to determine an interference profile for the MIMO signal.

5. The performance determination apparatus of claim 1, wherein the signal analysis module is configured to estimate a bandwidth associated with the MIMO signal at the GPS location at which the signal analysis module received the MIMO signal.

6. The performance determination apparatus of claim 1, wherein one or more data values comprise received signal strength indicator (RSSI) values received by the signal receiver module associated with the performance determination apparatus.

7. The performance determination apparatus of claim 6, wherein the signal receiver module comprises four receive chains.

8. A method comprising:
identifying, by a global positioning system (GPS) module, a plurality of GPS locations of a signal receiver module during test procedure;
receiving test data from a first node of a mesh network via wireless multiple input multiple output (MIMO) signals, each MIMO signal having four streams at the plurality of GPS locations, the data in each stream of the MIMO signals being transmitted with varying characteristics, a copy of the test data being received via a single stream signal;
analyzing the wireless MIMO signals at the plurality of GPS locations;
determining a signal quality parameter of the wireless MIMO signals based at least in part on signal quality values for each stream of the MIMO signals at the plurality of GPS locations;
estimating a bandwidth available from the mesh network at the plurality of GPS locations; and
identifying a GPS placement site to position an additional node in the mesh network based at least in part on the signal quality parameters of the wireless MIMO signals taken at the plurality of locations.

9. The method of claim 8, wherein analyzing the wireless MIMO signals comprises collecting received signal strength indicator (RSSI) on one or more receive chains of a receiver used to analyze the wireless MIMO signals.

10. The method of claim 8, wherein analyzing the wireless MIMO signals further comprises identifying one or more sources of interference with the wireless MIMO signals.

11. The method of claim 8, further comprising generating a graphical representation of a quality of the wireless MIMO signals.

12. A system comprising:
a computing device comprising:
a processor;
a memory device; and
a performance determination apparatus comprising:
a signal receiver module having a plurality of antennas to receive test data from a first node of a mesh network, a first copy of the test data being received via a wireless multiple input multiple output (MIMO) signal having four streams, the data in each stream of the MIMO signal being transmitted with varying characteristics, a second copy of the test data being received via a single stream signal;
a signal analysis module configured determine a signal quality parameter of the wireless MIMO signal based at least in part on signal quality values for each stream of the MIMO signal and to store signal data in the memory device;
a global positioning system (GPS) module configured to determine a plurality of GPS locations at which the signal receiver module receives the wireless MIMO signal; and
a placement module configured to identify a GPS placement site to position an additional node in the mesh network based at least in part on the signal quality parameters of the wireless MIMO signal taken at the plurality of GPS locations.

13. The system of claim 12, wherein the signal analysis module is further configured to evaluate a quality of each of the plurality of streams received from the node.

* * * * *